(12) United States Patent
Krueger et al.

(10) Patent No.: US 7,373,514 B2
(45) Date of Patent: May 13, 2008

(54) HIGH-PERFORMANCE HASHING SYSTEM

(75) Inventors: Jon H. Krueger, San Diego, CA (US); Wajdi K. Feghali, Ottawa (CA); Gilbert Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 10/624,533

(22) Filed: Jul. 23, 2003

(65) Prior Publication Data

US 2005/0044134 A1 Feb. 24, 2005

(51) Int. Cl.
*H04L 9/00* (2006.01)
(52) U.S. Cl. ...................................... 713/181
(58) Field of Classification Search ................ 707/100; 713/181
See application file for complete search history.

(56) References Cited

U.S. PATENT DOCUMENTS

| | | | |
|---|---|---|---|
| 5,339,398 A | 8/1994 | Shah et al. | |
| 5,920,900 A | 7/1999 | Poole et al. | |
| 5,960,434 A * | 9/1999 | Schimmel | 707/100 |
| 6,067,547 A * | 5/2000 | Douceur | 707/100 |
| 6,226,710 B1 * | 5/2001 | Melchior | 711/108 |
| 6,360,218 B1 * | 3/2002 | Zander et al. | 707/7 |
| 6,470,329 B1 | 10/2002 | Livschitz | |
| 6,539,373 B1 | 3/2003 | Guha | |
| 6,578,131 B1 | 6/2003 | Larson et al. | |
| 6,594,665 B1 | 7/2003 | Sowa et al. | |
| 6,631,419 B1 * | 10/2003 | Greene | 709/238 |

OTHER PUBLICATIONS

English Translation of Official Letter, Dated Oct. 14, 2005 in Corresponding Taiwan Application No. 93120853, 1 pg.
Transmission Control Protocol, DARPA Internet Program, Protocol Specification, RFC: 793, Information Sciences Institute, University of Southern California, Marina del Rey, California.
Broder, et al, "Using Multiple Hash Functions to Improve IP Lookups", IEEE InfoCom, pp. 1-11, 2001.

* cited by examiner

Primary Examiner—Gilberto Barron, Jr.
Assistant Examiner—Farid Homayounmehr
(74) Attorney, Agent, or Firm—Grossman, Tucker, Perreault & Pfleger, PLLC

(57) ABSTRACT

A high-performance, low-latency data retrieval system is disclosed using hash functions. Given a set of input data, the data retrieval system may generate one or more index values and a signature value according to a predetermined hash function. The index values may be applied to respective data arrays to access a data unit therein. The data unit may include signatures previously developed when populating the array. If a signature from the data unit matches the signature generated from the hash function, then the associated index may be applied to a second portion of the respective data array to retrieve requested data.

40 Claims, 5 Drawing Sheets

100

1000

400

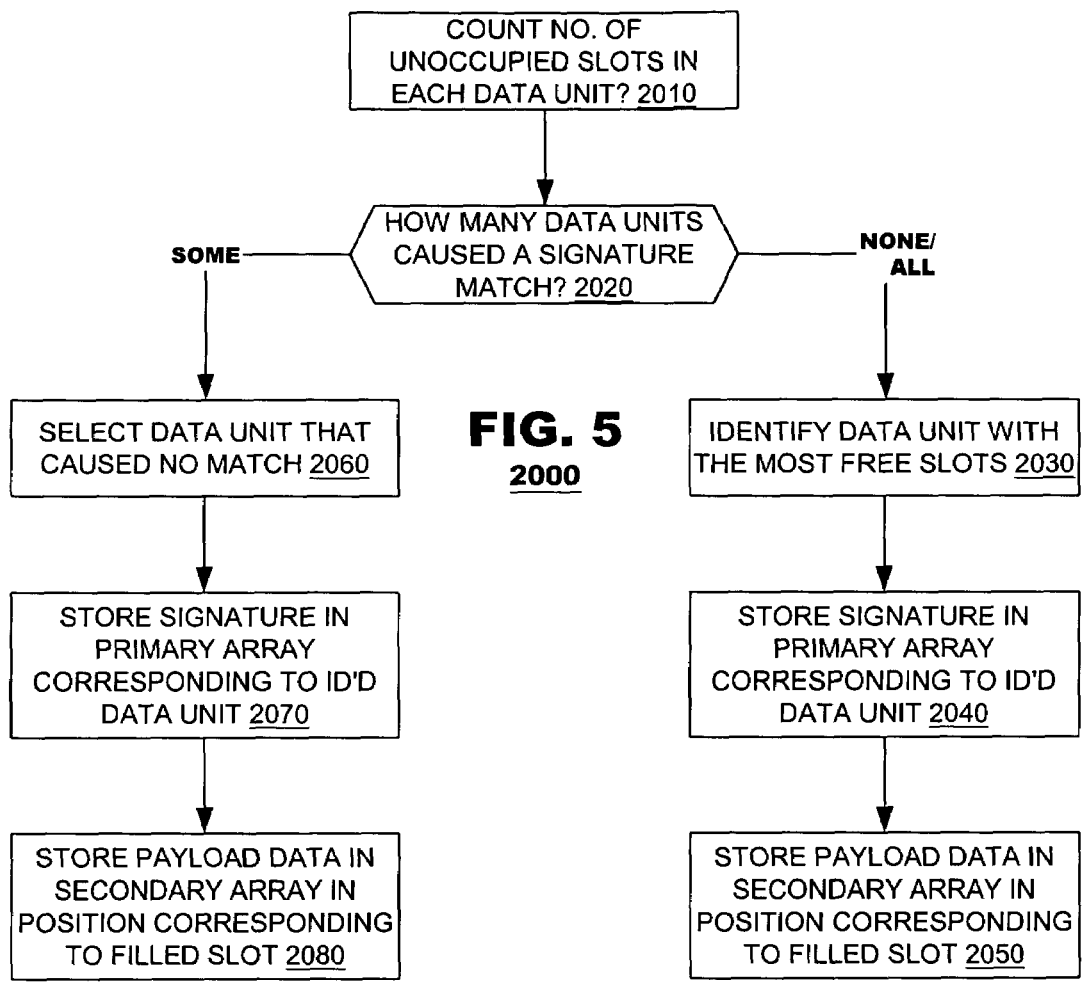

HIGH-PERFORMANCE HASHING SYSTEM

BACKGROUND

Embodiments of the present invention relate to memory lookup operations using hash functions and, particularly, to such operations that are designed for large scale memories.

"Hashing" generally describes a technique for searching for data within a memory system. Given a set of input data, a hashing function generates an index value. When applied to a memory, the index value should cause requested data to be read therefrom. Unfortunately, depending upon the hash function used, index values may not uniquely identify the requested data. It is possible that a hash function can generate the same index value for two or more unique input values. This is called a "collision." To guard against the possibility of collisions, the index value typically is used as a pointer to a linked list of data. Each element in the linked list typically contains the data being sought (called, the "payload" data herein), a copy of the input data to which it relates and a pointer to the next element in the linked list. In such systems, it becomes necessary to examine each element in the linked list serially until the copy of the input data confirms that responsive data has been found or until the linked list is exhausted.

In those systems described above, the serial examination of each element in the linked list wastes time. It can be particularly disadvantageous in high-performance applications or those involving massive data sets (millions of memory entries or more). Consider, for example, the process of searching an established connection table to support the well-known transmission control protocol (TCP). Given an input tuple that includes an IP source address, an IP destination address, a TCP source port and a TCP destination port, the process must search a memory to retrieve data representative of the connection state. Using a conventional linked list implementation, as the number of active connections grows, the rate of collisions and the length of the linked lists also grow. Hypothetically, if an index hits a linked list with six entries, a system must read each entry in order to detect a match. Because each entry in the list includes a pointer to the next entry in the list, the various entries cannot be read in parallel. Up to six sequential memory reads would be required before it could be determined whether the input data hit or missed the memory. Thus, the latency problems of such implementations can be severe.

In one well-known TCP implementation, IP source and destination addresses each are represented as 32 bit quantities and TCP source and destination ports are represented as 16 bit quantities. To accommodate all possible variations in these values, a TCP connection table would require $2^{96}$ entries if implemented without a hash function. A hash function that generates a 32 bit hash value, however, reduces the size of the connection table to $2^{32}$ entries (about 4.3 million entries). In another TCP implementation, where IP source and destination addresses are represented as 128 bit values, a TCP connection table would require $2^{228}$ entries. The 32 bit hash value again would reduce the size of the connection table to $2^{32}$ entries. In this latter implementation, a vastly larger number of unique combinations of input data would map to the same 4.3 million hash values, which raises the collision rate proportionally when compared to the first implementation.

The inventors perceive a need in the art for a high performance hashing algorithm that provides improved performance for large scale memories. They further perceive a need in the art for a hash-based lookup system that avoids the problems of serial reads throughout linked list data structures.

BRIEF DESCRIPTION OF THE DRAWINGS

FIG. 5 illustrates a method according to an embodiment of the invention.

DETAILED DESCRIPTION

Embodiments of the present invention provide a high-performance, low-latency data retrieval system using hashing. Given a set of input data, the data retrieval system may generate one or more index values and a signature value according to a predetermined hash function. The index values may be applied to respective data arrays to access a data unit therein. The data unit may include signatures previously developed when populating the system. If a signature from the data unit matches the signature generated from the hash function, then the associated index may be applied to a second portion of the respective data array to retrieve the payload data.

Figure 1:
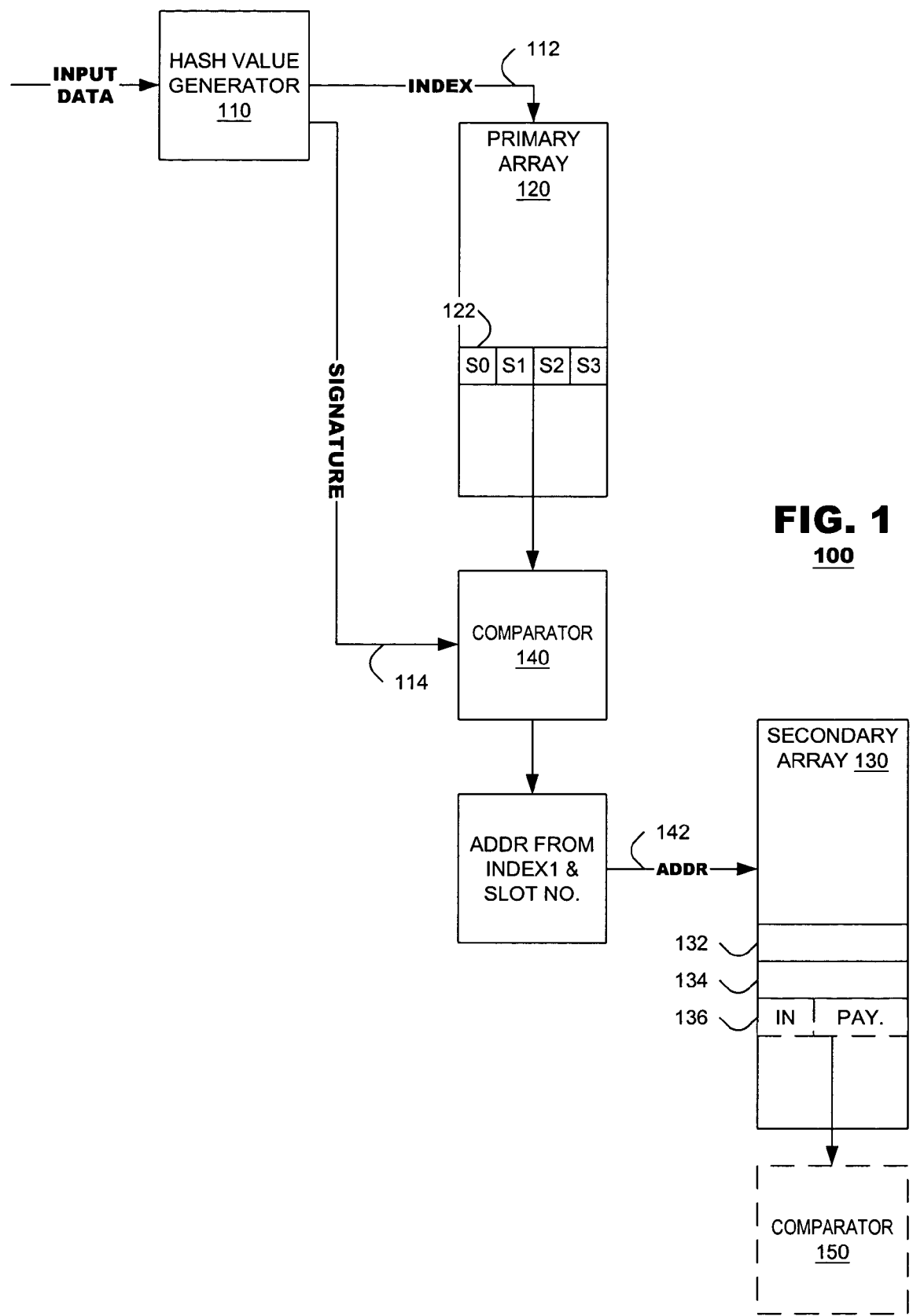
FIG. 1 is a block diagram of a system 100 according to an embodiment of the present invention.

FIG. 1 illustrates a data retrieval system 100 according to an embodiment of the present invention. The system 100 may include a hash value generator 110, primary and secondary data arrays 120, 130 and a comparator 140. The hash value generator 110, as its name implies, may apply a predetermined hash function to input data, generating an index value on line 112 and a signature value on line 114. The primary data array 120 may store, for each unique value of an applied address, a data unit 122 storing one or more signature values (S0-S3). The secondary data array 130 may store payload data (e.g., 132, 134) associated with each value of input data.

The system 100 may respond to an external lookup command that seeks payload data in response thereto. The lookup command may include input values that identify the payload data. When an input value is applied to the system 100, the hash function generator 110 may generate the index and signature values 112, 114. The index value 112 may be applied to the primary data array 120 as an address. In response to the index value 112, the primary data array 120 may output a data unit 122 to the comparator 140. The data unit 122 may include a plurality of slots for storage of signature values.

The comparator 140 may compare the signature value on line 114 to any signatures present in the retrieved data unit 122. The comparator 140 may detect not only a match between signatures but also the matching signature's slot position within the data unit 122. In the example shown in FIG. 1, the data unit is illustrated as including four slot positions S0-S3. If the signature at position S2 matches the signature on line 114, the comparator may generate an output on line 142 indicating that a signature match occurred at the third slot position.

The index value 112 and the position value 142 may be input to the secondary data array 130 merged as an address signal. In response, the secondary data array 130 may output a unit of payload data 132 from within the array 130. The payload data can be returned in response to the lookup command.

The foregoing embodiment avoids the latencies inherent in linked list hashing systems noted above. Regardless of the rate of collisions among index values, payload data can be retrieved from a memory system with only two memory reads. Thus, while the given index value still may not represent the input data uniquely, the foregoing embodiments resolve ambiguities through use of a signature in the primary data array. The signature's position helps determine the payload data's position in memory and permits the system to avoid traipsing across multiple entries as in the linked list system.

This embodiment additionally permits system designers to manage the size of data arrays present in the system. Consider an example where a hash function reduces the $2^{228}$ combinations of IP/TCP input data to a 128 bit hash value. In this example, one may take 32 bits of the hash value as an index value and another 8 bits of the hash value as a signature value. The 32 bit index value leads to a primary array size of $2^{32}$ (again, about 4.3 million entries). For the purposes of this example, one may choose to provide 8 slots in each entry for storage of a signature value. This would cause the secondary array to have about 34 million entries. By contrast, if one simply were to consider the 32 bit index and the 8 bit signature value as one aggregate index value, it would require an array table having about 1.1 billion entries—about 28 times the size of the primary and secondary arrays combined. Thus, the foregoing embodiment can provide for conservation of memory resources.

It is expected that in practice one may design the primary data array 120 of this embodiment to include a sufficient number of signature positions to accommodate expected collision rates that will occur due to the hash function employed by the hash value generator 110. The higher the rate of collisions, the greater the number of slots there may be.

As explained, the hash value generator 110 may operate according to a hash function. Any of a variety of hash functions may be utilized in various embodiments of the invention. Various hash functions are known and each of them vary in terms of their complexity and the probability of collisions among input values. At a high level, the hash functions generate a hash value according to an irreducible polynomial. For example, from the 128 bit IP addresses and 16 bit TCP port designators described above, the hash function may generate a 128 bit hash value. The index values and signature values herein simply may be taken from predetermined portions of this 128 value. Although permissible, collision rates can be minimized if the index value and the signature values are taken from non-overlapping portions of the hash value.

Depending upon the hash function used, it may be possible that collisions will occur among signature values. In another embodiment, shown in phantom in FIG. 1, signature collisions may be resolved by storing payload data and its associated input value together in an entry 136 of the secondary data array 130. When data is read out of the secondary data array 130, a second comparator 150 may compare the received input data with the input data that is output from the selected entry 136. If they match, then the payload data from the entry 136 may be returned in response to the lookup command. If not, then the data was selected due to an errant collision of the hash function and it probably is not responsive to the lookup command.

Figure 2:
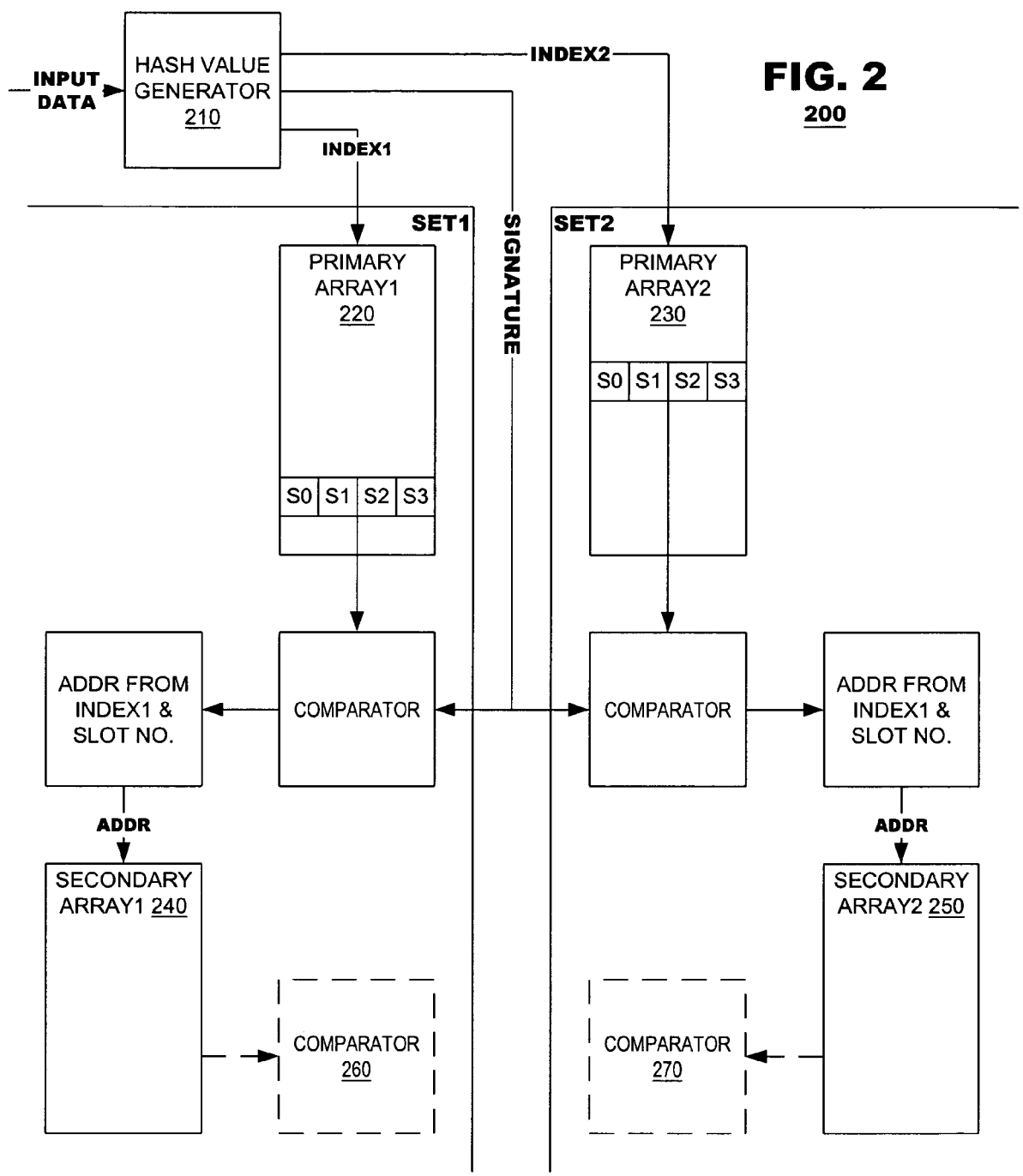
FIG. 2 is a block diagram of a system 200 according to another embodiment of the present invention.

FIG. 2 illustrates a data retrieval system 200 according to another embodiment of the present invention. In this embodiment, the system may include multiple independent sets of primary and secondary data arrays. Two sets (set 1 and set 2) are shown in the example of FIG. 2 but the number may be increased as needed to accommodate any expected rate of collisions between the various index values and signature values.

The system 200 may include a hash value generator 210, a pair of primary data arrays 220, 230 and a pair of secondary data arrays 240, 250. In this embodiment, the hash value generator may apply a hash function to input data to generate a hash value therefrom. A first portion of the hash value may be used as an index (index1) to be applied to the first primary data array 220. A second portion of the hash value may be used as a second index (index2) to be applied to the second primary data array 230. A third portion of the hash value may be selected for use as the signature.

Responsive to the index1 value, the first primary data array 220 may output a data unit that includes a plurality of signatures provided in predetermined slot positions therein. The signatures from the first primary data array 220 each may be compared to the signature from the hash value generator 210. On a match, the index1 value and a position value indicating the slot position of the matching signature may be applied to the first secondary data array 240. These inputs may cause the first secondary data array 240 to output a data value therefrom. The output of the first secondary data array 240 may be responsive to the lookup command.

According to an embodiment, complementary processes may occur in the additional sets of primary and secondary data arrays (e.g., 230, 250). The index2 value, when applied to the second primary data array 230 may cause data to be output therefrom. The data may include a plurality of previously-stored signature values at predetermined positions therein. A comparison may be made of the output signature values and the signature value output from the hash value generator 210. If a match occurs, the index2 value and the matching signature's position may be applied to the second secondary data array 250. The second secondary data array 250 may output data that is responsive to the lookup command.

The embodiment of FIG. 2 further reduces the likelihood of collisions among output data. As in the embodiment of FIG. 1, the use of an index value (say, index) and a signature value reduces the likelihood that the system will permit multiple sets of input data to refer to the same entry in the primary data array. Additionally, the FIG. 2 embodiment provides additional protection against collisions through use of multiple index values (index1, index2) with a signature value.

According to an embodiment of the present invention, shown in FIG. 2 in phantom, the system 200 may include an additional layer of comparators 260, 270 coupled to outputs of the secondary data arrays 240, 250. In this embodiment, entries of the secondary data arrays may include both payload data and the input data to which the payload data corresponds. The comparators 260, 270 may determine if the data input to the hash value generator 210 matches the values output from the respective secondary data arrays 240, 250. If so, then it is confirmed that the payload data is responsive to the input data. Otherwise, the payload data can be considered non-responsive.

Figure 3:
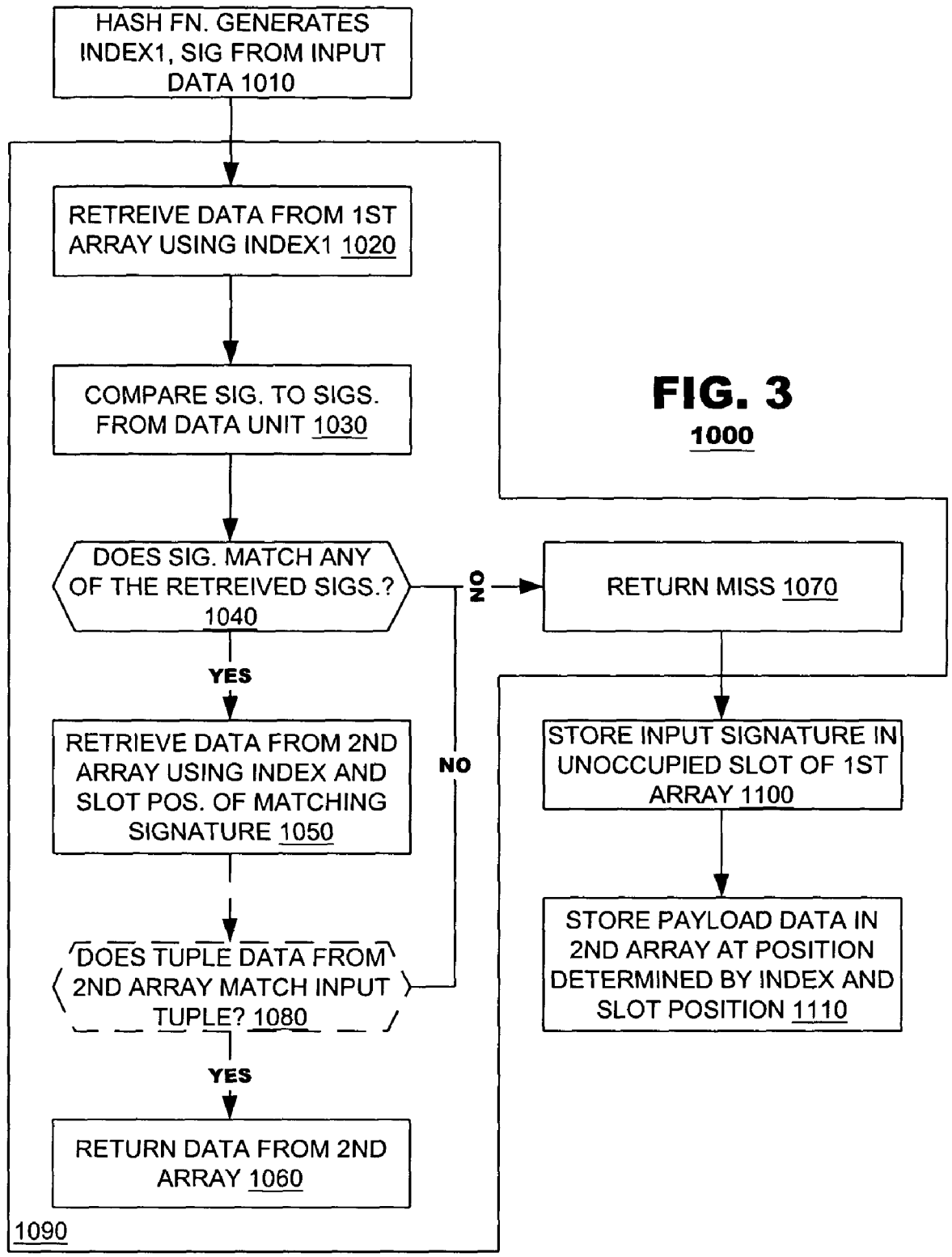
FIG. 3 is a flow diagram of a method 1000 according to an embodiment of the present invention.

FIG. 3 is a flow diagram of a method 1000 according to an embodiment of the present invention. When new input data is available, a hash function may operate on the input data (box 1010). An index value and signature value may be selected from the hash value obtained thereby. The index value may be used to retrieve a first data unit from a data array (box 1020). Thereafter, the signature value may be compared to signature values contained within the data unit to determine whether there is a match (boxes 1030, 1040). If a match occurs, then a second data unit may be retrieved from a memory using the index value and the matching signature's position within the retrieved data unit as an address (box 1050). The second data unit may contain data responsive to the lookup command (box 1060).

If none of the signatures from the first data unit match the newly generated signature, then the system returns a response to the lookup command indicating that the requested data is not present in the memory (box 1070).

In an alternate embodiment, when the second data unit is retrieved from memory, the method may compare the input data to an input data field present in the second data unit and determine if there is a match between them (box 1080). If so, the method may proceed to box 1060, using payload data stored in the second data unit as a response to the lookup command. If not, the method may proceed to box 1080 and return an indication that the lookup command missed the memory (box 1070).

In embodiments involving multiple index values obtained from the hash function, for example, index1 and index2 from FIG. 2, the method 1000 may perform the operations illustrated in boxes 1020-1080 independently for each index value. Bounding box 1090 is provided in FIG. 3 to illustrate this functionality.

In certain applications, if a lookup command misses the memory system, a new entry may be allocated to the input data of the lookup command. For example, in a TCP application, if input data does not refer to an active connection, then a new connection will be established. Thus, an embodiment permits a new entry to be allocated to the memory system on a miss. Allocation of a new embodiment can cause the signature value to be stored in an unoccupied slot in a primary data array (box 1100) and payload data to be stored in an entry of a corresponding secondary data array at a position identified by the index and the slot now occupied by the generated signature (box 1110).

Figure 4:
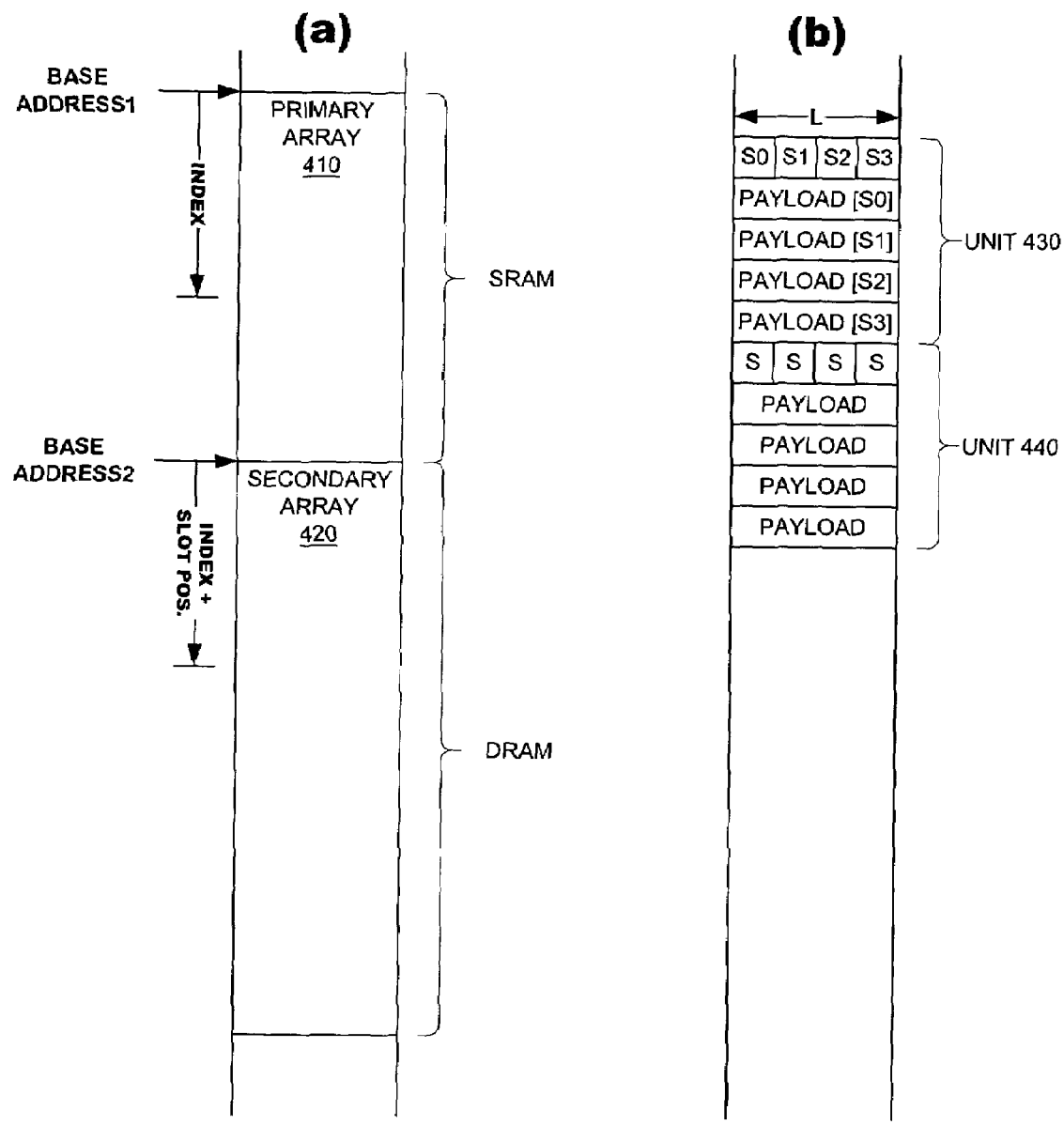
FIGS. 4(a) and 4(b) illustrate a memory space according to an embodiment of the present invention.

The foregoing description has explained the operation of the present invention in the context of discrete data arrays. In an embodiment, each of these arrays may be distributed throughout a common memory system as is shown in FIG. 4. FIG. 4(*a*) illustrates primary and secondary data arrays 410, 420 in a memory space, where each data array is identifiable through a base memory address. Accessing data units from a primary data array 410, in this embodiment, can be as simple as using the index value as an offset from a first base address. Accessing data units from a secondary data array 420 in this embodiment may occur by using the index value and the position value as an offset from the secondary data array's base address. Of course, there is no requirement that primary and secondary data arrays 410, 420 be provided in continuous spaces in memory or that they be adjacent to one another as shown in FIG. 4(*a*). In one embodiment, the smaller primary data array 410 may be provided in an SRAM memory and the secondary data array 420 may be provided in a DRAM memory. The principles of the foregoing embodiments can be employed cooperatively with other memory management schemes as may be desired.

In another embodiment, illustrated in FIG. 4(*b*), stored signatures and corresponding payload data may be stored as contiguous units 430, 440 in memory. In this system, signatures may be stored at memory locations offset from a base address by an amount N*L*index, where N represents the number of signatures stored per primary array entry (N=4 in the example of FIG. 4(*b*)) and L represents the length of the signature field in bytes. Associated payload data may be stored in memory locations adjacent to the stored signatures. If a signature match occurs, the payload portions may be offset from the primary array entry by the slot position of the matching signature (e.g., (N*L*index)+1, (N*L*index)+2, etc.).

FIG. 5 is a flow diagram, according to an embodiment, of a method 2000 that selects one of multiple sets of data arrays to store new payload data. As noted, during a lookup operation, various index values may cause a data unit to be retrieved from each of the primary data arrays. According to an embodiment, the method may count the number of unoccupied slots in each of these data units (box 2010); the unoccupied slots are available to store a new signature value. The method also may determine how many data units generated a signature match in any position during the lookup operation (box 2020). If none of the data units caused a match with the generated signature value, then the method may determine which of the data units has the greatest number of empty slots (box 2030). The method may cause the signature value that was generated during the lookup operation to be stored in an empty slot of the data unit in the corresponding primary data array (box 2040). The method also may cause payload data to be stored in a position of an associated secondary data array at a location dictated by the index value and the position of the now-occupied slot in the primary data array (box 2050). The operations described at boxes 2030, 2040 and 2050 also may be employed if signature matches occurred for all primary data arrays in the system.

If some of the data units caused a match, then the payload data may be stored in one of the sets that does not cause a match (box 2060). The signature value may be stored in an empty slot of the primary array and the payload data may be stored in entry of the secondary array that corresponds to the index and the position of the now-occupied slot (boxes 2070, 2080). If there are multiple data items that did not cause a match with the signature then, of these, the set that corresponds to the data unit having the greatest number of empty slots may be selected for use in a manner consistent with box 2030.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. Apparatus for use in data retrieval, comprising:
   a hash value generator configured to generate an index value and a signature value, based on input data,
   a first memory array configured to receive the index value as an address, said first memory array is further configured to output, in response to said index value, a data unit comprising a plurality of signature values arranged in respective positions in said data unit; and
   a comparator configured to receive the signature value and said data unit from the first memory array, the comparator is further configured to compare the signature value with the plurality of signature values of said data unit, and if a match is found, said comparator is further configured to generate an address signal including said address of said index value and the position corresponding to the matching signature values in a second memory array, said second memory array configured to receive said address signal including said index value and the position corresponding to the matching signature values and, in response thereto, output payload data without serially searching a linked list associated with said second memory array.

2. The apparatus of claim 1, wherein the first memory array comprises a plurality of entries, each entry having fields to store signature values of respective data units.

3. The apparatus of claim 1, wherein the second memory array comprises a plurality of entries, each entry having fields to store payload data responsive to an input data value to be input to the hash value generator.

4. The apparatus of claim 3, wherein entries of the second memory array further comprise a field to store a copy of input data to which the payload data relates.

5. The apparatus of claim 4, further comprising a comparator coupled to the input of the hash value generator and to the second memory array.

6. The apparatus of claim 1, wherein an output of the comparator includes a position indicator indicative of a field in an away entry that causes a match with a signature value.

7. The apparatus of claim 1, further comprising an input to the hash value generator.

8. The apparatus of claim 1, wherein the hash value generator has inputs for IP source and destination addresses and TCP source and destination port designators.

9. The apparatus of claim 8, wherein the IP source and destination address have a bit length of 32.

10. The apparatus of claim 8, wherein the IP source and destination address have a bit length of 128.

11. The apparatus of claim 1, wherein the index value and signature value are selected from non-overlapping portions of a common hash value.

12. The apparatus of claim 1, wherein the first memory array is provided in SRAM and the second memory away is provided in DRAM.

13. The apparatus of claim 1, wherein the first and second memory arrays are commingled members of a common memory system.

14. Apparatus for use in data retrieval, comprising:
a hash value generator configured to generate at least two index values and a signature value,
for each index value from the hash value generator:
a first memory array configured to receive the index value as an address, said first memory array is further configured to output, in response to said index value, a data unit comprising a plurality of signature values arranged in respective positions in said data unit,
a comparator configured to receive the signature value and said data unit from the first memory array, the comparator is further configured to compare the signature value with the plurality of signature values of said data unit, and if a match is found, said comparator is further configured to generate an address signal including said address of said index value and the position corresponding to the matching signature values in a second memory array, said second memory array configured to receive said address signal including said index value and the position corresponding to the matching signature values and, in response thereto, output payload data without serially searching a linked list associated with said second memory array.

15. The apparatus of claim 14, wherein entries of the first memory array comprise a plurality of fields to store signature values.

16. The apparatus of claim 14, further comprising a comparator having a pair of inputs coupled respectively to an output of the second memory array and to an input of the hash value generator.

17. The apparatus of claim 14, wherein entries of the second memory array are to store only payload data.

18. The apparatus of claim 14, wherein entries of the second memory array have fields to store payload data and input data to which the payload data corresponds.

19. The apparatus of claim 14, wherein the hash value generator has inputs for IP source and destination addresses and TCP source and destination port designators.

20. The apparatus of claim 19, wherein the IP source and destination address have a bit length of 32.

21. The apparatus of claim 19, wherein the IP source and destination address have a bit length of 128.

22. The apparatus of claim 14, wherein the index values and signature values each are selected from non-overlapping portions of a common hash value.

23. The apparatus of claim 14, wherein the first memory array is provided in SRAM and the second memory array is provided in DRAM.

24. The apparatus of claim 14, wherein the first and second memory arrays are commingled members of a common memory system.

25. A data retrieval method, comprising:
responsive to input data, generating an index value and a signature value through a hash function,
retrieving a first data unit using the index value from a first memory array,
comparing signature values in the first data unit to the generated signature value,
if a match occurs, generating an address signal including an address of said index value and a position corresponding to the matching signature values in a second memory array, said second memory array configured to receive said address signal including said index value and the position corresponding to the matching signature values and, in response thereto, output payload data without serially searching a linked list associated with said second memory array.

26. The data retrieval method of claim 25, further comprising comparing the input data to a portion of data in the second data unit and, if they match, outputting a second portion of the data unit.

27. The data retrieval method of claim 26, further comprising, if the input data and the data portion do not match, outputting an indication that the input data misses the memory.

28. The data retrieval method of claim 25, further comprising, if the generated signature does not match any signature in the first data unit, allocating a new entry to the input data and storing the generated signature in an unoccupied position of the first data unit.

29. The data retrieval method of claim 25, wherein the index value and generated signature value each are selected from non-overlapping portions of a common hash value.

30. The data retrieval method of claim 25, wherein the input data is IP source and destination addresses and TCP source and destination port designators.

31. The data retrieval method of claim 30, wherein the IP source and destination address have a bit length of 32.

32. The data retrieval method of claim 30, wherein the IP source and destination address have a bit length of 128.

33. A data retrieval method, comprising:
responsive to input data, generating a plurality of index values and a signature value through a hash function, for each index value:
retrieving a first data unit from a respective first memory array using a respective index value,
comparing signature values in the first data unit to the generated signature value,
if a match occurs, generating an address signal including an address of said index value and a position corresponding to the matching signature values in a second memory array, said second memory array configured to receive said address signal including said index value and the position corresponding to the matching signature values and, in response thereto, output payload data without serially searching a linked list associated with said second memory array.

34. The data retrieval method of claim 33, further comprising comparing the input data to a portion of data in the second data unit and, if they match, outputting a second portion of the data unit.

35. The data retrieval method of claim 34, further comprising, if the input data does not match any of the second data units, outputting an indication that the input data misses the memory.

36. The data retrieval method of claim 33, further comprising, if the generated signature does not match any signature in the first data unit, allocating a new entry to the input data and storing the generated signature in an unoccupied position of the first data unit.

37. The data retrieval method of claim 33, wherein the index values and signature value each are selected from non-overlapping portions of a common hash value.

38. The data retrieval method of claim 33, wherein the input data is IP source and destination addresses and TCP source and destination port designators.

39. The data retrieval method of claim 38, wherein the IP source and destination address have a bit length of 32.

40. The data retrieval method of claim 38, wherein the IP source and destination address have a bit length of 128.

* * * * *

UNITED STATES PATENT AND TRADEMARK OFFICE
CERTIFICATE OF CORRECTION

PATENT NO. : 7,373,514 B2  Page 1 of 1
APPLICATION NO. : 10/624533
DATED : May 13, 2008
INVENTOR(S) : Krueger et al.

It is certified that error appears in the above-identified patent and that said Letters Patent is hereby corrected as shown below:

On Sheet 3 of 5, in FIG. 3 (Reference Numeral 1020), line 1, delete "RETREIVE" and insert -- RETRIEVE --, therefor.

On Sheet 3 of 5, in FIG. 3 (Reference Numeral 1040), line 2, delete "RETREIVED" and insert -- RETRIEVED --, therefor.

In column 7, line 23, in Claim 6, delete "away" and insert -- array --, therefor.

In column 7, line 38, in Claim 12, delete "away" and insert -- array --, therefor.

Signed and Sealed this

Twelfth Day of August, 2008

JON W. DUDAS
*Director of the United States Patent and Trademark Office*